US012567127B2

(12) United States Patent
Hiasa

(10) Patent No.: US 12,567,127 B2
(45) Date of Patent: Mar. 3, 2026

(54) MEDICAL USE IMAGE PROCESSING METHOD, MEDICAL USE IMAGE PROCESSING PROGRAM, MEDICAL USE IMAGE PROCESSING DEVICE, AND LEARNING METHOD

(71) Applicant: FUJIFILM Corporation, Tokyo (JP)

(72) Inventor: Yuta Hiasa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 370 days.

(21) Appl. No.: 18/338,350

(22) Filed: Jun. 21, 2023

(65) Prior Publication Data

US 2023/0342882 A1 Oct. 26, 2023

Related U.S. Application Data

(63) Continuation of application No. PCT/JP2021/045791, filed on Dec. 13, 2021.

(30) Foreign Application Priority Data

Dec. 24, 2020 (JP) ................................. 2020-214723

(51) Int. Cl.
*G06T 3/18* (2024.01)
*A61B 5/055* (2006.01)
(Continued)

(52) U.S. Cl.
CPC .................. *G06T 3/60* (2013.01); *G06T 3/40* (2013.01); *G06T 5/50* (2013.01); *G06T 2200/04* (2013.01);
(Continued)

(58) Field of Classification Search
CPC .... G06T 3/60; G06T 3/40; G06T 5/50; G06T 2200/04; G06T 2207/10081;
(Continued)

(56) References Cited

U.S. PATENT DOCUMENTS

2012/0262460 A1 10/2012 Endo et al.
2016/0125605 A1 5/2016 Lee et al.
(Continued)

FOREIGN PATENT DOCUMENTS

CN 109102532 A * 12/2018 ............... G06T 7/33
JP 2012217770 11/2012
(Continued)

OTHER PUBLICATIONS

Yue Zhang et al., "Task Driven Generative Modeling for Unsupervised Domain Adaptation: Application to X-ray Image Segmentation", International Conference on Medical Image Computing and Computer-Assisted Intervention, Jun. 11, 2018, retrieved from arXiv database, arXiv:1806.07201v1 [cs.CV], , pp. 1-9.
(Continued)

*Primary Examiner* — Andrew M Moyer
*Assistant Examiner* — Dylan John Mendez Muniz
(74) *Attorney, Agent, or Firm* — JCIPRNET

(57) ABSTRACT

A medical use image processing method according to an aspect of the present invention is a medical use image processing method executed by a medical use image processing device including a processor, the medical use image processing method including causing the processor to execute a reception step of receiving input of a first medical use image actually captured in a first posture, and an image generation step of generating a second medical use image, in which the same portion as the first medical use image is imaged in a second posture different from the first posture, from the first medical use image in a pseudo manner, in which the second medical use image is generated by using a deformation vector field that converts the first medical use image into the second medical use image.

16 Claims, 16 Drawing Sheets

(51) Int. Cl.

| | | |
|---|---|---|
| *A61B 6/03* | (2006.01) | |
| *G06T 3/40* | (2006.01) | |
| *G06T 3/60* | (2006.01) | |
| *G06T 5/50* | (2006.01) | |

(52) U.S. Cl.

CPC .............. *G06T 2207/10081* (2013.01); *G06T 2207/10121* (2013.01); *G06T 2207/20081* (2013.01); *G06T 2207/20084* (2013.01); *G06T 2207/30061* (2013.01)

(58) Field of Classification Search

CPC . G06T 2207/10121; G06T 2207/20081; G06T 2207/20084; G06T 2207/30061; G06T 3/18; A61B 5/055; A61B 6/03

See application file for complete search history.

(56) References Cited

U.S. PATENT DOCUMENTS

| | | | |
|---|---|---|---|
| 2017/0011509 A1 * | 1/2017 | Ryu ........................ | A61B 6/486 |
| 2019/0066375 A1 | 2/2019 | Eiben et al. | |

FOREIGN PATENT DOCUMENTS

| | | | | | |
|---|---|---|---|---|---|
| JP | 2012217770 A | * | 11/2012 | ........... | A61B 8/0825 |
| JP | 201573799 A | * | 4/2015 | | |
| JP | 2015073799 | | 4/2015 | | |
| JP | 2015130973 | | 7/2015 | | |
| JP | 2019506949 | | 3/2019 | | |
| JP | 2019180637 A | * | 10/2019 | ........... | G06T 7/0012 |
| JP | 2019198376 | | 11/2019 | | |
| JP | 6732593 B2 | * | 7/2020 | | |

OTHER PUBLICATIONS

Justin Johnson et al., "Perceptual Losses for Real-Time Style Transfer and Super-Resolution", Computer Vision—ECCV 2016: 14th European Conference, Mar. 27, 2016, retrieved from arXiv database, arXiv:1603.08155v1 [cs.CV], pp. 1-18.

Augustus Odena et al., "Conditional Image Synthesis with Auxiliary Classifier GANs", International conference on machine learning. PMLR, Jul. 20, 2017, retrieved from arXiv database, arXiv:1610.09585v4 [stat.ML], pp. 1-12.

Tero Karras et al., "Progressive Growing of GANs for Improved Quality, Stability, and Variation", ICLR 2018 Conference, Feb. 26, 2018, retrieved from arXiv database, arXiv:1710.10196v3 [cs.NE], pp. 1-26.

"International Search Report (Form PCT/ISA/210) of PCT/JP2021/045791", mailed on Mar. 15, 2022, with English translation thereof, pp. 1-5.

"Written Opinion of the International Searching Authority (Form PCT/ISA/237) of PCT/JP2021/045791", mailed on Mar. 15, 2022, with English translation thereof, pp. 1-8.

"Office Action of Japan Counterpart Application", issued on Jul. 1, 2025, with English translation thereof, p. 1-p. 8.

* cited by examiner

GENERATOR

114

DEFORMATION
VECTOR FIELD

116

CONVERTER

120

IDENTIFIER

130

LEARNING
CONTROL UNIT

150

RESOLUTION
CONVERSION UNIT

200

STORAGE
DEVICE

300

DISPLAY DEVICE

400

OPERATION UNIT

500

COMMUNICATION
UNIT

760

HIGH-RESOLUTION
DECUBITUS
ACTUAL CT IMAGE

150

RESOLUTION
CONVERSION UNIT

770

LOW-RESOLUTION
DECUBITUS
ACTUAL CT IMAGE

FIG. 17

MEDICAL USE IMAGE PROCESSING METHOD, MEDICAL USE IMAGE PROCESSING PROGRAM, MEDICAL USE IMAGE PROCESSING DEVICE, AND LEARNING METHOD

CROSS-REFERENCE TO RELATED APPLICATIONS

The present application is a Continuation of PCT International Application No. PCT/JP2021/045791 filed on Dec. 13, 2021 claiming priority under 35 U.S.C § 119(a) to Japanese Patent Application No. 2020-214723 filed on Dec. 24, 2020. Each of the above applications is hereby expressly incorporated by reference, in its entirety, into the present application.

BACKGROUND OF THE INVENTION

1. Field of the Invention

The present invention relates to a technique of performing domain conversion of a medical use image.

2. Description of the Related Art

In the field of handling a medical use image (sometimes referred to as a medical image), from a medical use image actually captured in a certain domain (modality or the like), a medical use image captured in another domain is generated in a pseudo manner, and the generated image is used for various purposes (for example, utilization of label data attached to the medical use image, use as an image for machine learning, and observation or diagnosis of a lesion).

For example, JP2019-198376A discloses that a virtual fluoroscopic image is generated based on three-dimensional volume data reconstructed from a tomographic image acquired by a computed tomography (CT) apparatus, and the generated image is used as data for machine learning. In addition, "Task driven generative modeling for unsupervised domain adaptation: Application to x-ray image segmentation.", MICCAI 2018, Zhang, Yue et al., [search on Dec. 8, 2020], the Internet (https://arxiv.org/abs/1806.07201) describes that a pseudo X-ray image generated from a CT image is converted into an actual X-ray image, and an organ is extracted from the converted image (label is attached).

SUMMARY OF THE INVENTION

It is possible to utilize annotation data for the original image in another image, to use the converted image as the data for machine learning, and the like by performing the domain conversion of the medical use image, but the number of medical use images acquired varies greatly depending on the domain, and a posture of a subject in a case of imaging is determined in many cases. In such a situation, even in a case in which the medical use images in different postures are simply converted, a domain shift occurs. For example, in JP2019-198376A, the posture conversion is performed using a simple conversion table according to the fat mass or the muscle mass, and the domain shift cannot be sufficiently reduced. In addition, in "Task driven generative modeling for unsupervised domain adaptation: Application to x-ray image segmentation.", MICCAI 2018, Zhang, Yue et al., [search on Dec. 8, 2020], the Internet (https://arxiv.org/abs/1806.07201), since the pseudo X-ray image generated from the CT image is an image in a supine posture and the converted X-ray image is an image in a standing posture, the domain shift occurs depending on the posture.

As described above, it has been difficult to reduce the domain shift in the domain conversion of the medical use image by the related art.

The present invention has been made in view of such circumstances, and is to provide a medical use image processing method, a medical use image processing program, a medical use image processing device, and a learning method capable of reducing a domain shift.

In order to achieve the object described above, a first aspect of the present invention relates to a medical use image processing method executed by a medical use image processing device including a processor, the medical use image processing method comprising causing the processor to execute a reception step of receiving input of a first medical use image actually captured in a first posture, and an image generation step of generating a second medical use image, in which the same portion as the first medical use image is imaged in a second posture different from the first posture, from the first medical use image in a pseudo manner, in which the second medical use image is generated by using a deformation vector field that converts the first medical use image into the second medical use image. In the medical use image processing method according to the first aspect, the domain shift can be reduced by generating the second medical use image from the first medical use image by using the deformation vector field instead of directly converting the medical use images to each other.

In the first aspect and each of the following aspects, the "deformation vector field" a set of vectors indicating the displacement (deformation of an image) from each voxel (or pixel; the same applies hereinafter) of the first medical use image to each voxel of the second medical use image. It should be noted that the term "the same" includes a case in which the portions are completely the same as well as a case in which at least a part of the portion is common.

A second aspect relates to the medical use image processing method according to the first aspect, in which, in the image generation step, the processor generates the deformation vector field by using a generator that outputs the deformation vector field in a case in which the first medical use image is input and that has been trained through machine learning. The second aspect defines one aspect of a generator construction method, and the generator can be constructed by performing learning using the first medical use image as learning data in the machine learning. The machine learning includes deep learning. In addition, in the second aspect, the generator constructed by a learning method (described later) according to thirteenth to seventeenth aspects may be used.

A third aspect relates to the medical use image processing method according to the first or second aspect, in which, in the image generation step, the processor generates the second medical use image by applying the deformation vector field to the first medical use image.

A fourth aspect relates to the medical use image processing method according to any one of the first to third aspects, in which, in the image generation step, the processor converts a resolution of the first medical use image into a low resolution lower than a resolution before conversion, generates the deformation vector field from the first medical use image converted into the low resolution, converts a resolution of the generated deformation vector field into a high resolution higher than a resolution before conversion, and generates the second medical use image having a high resolution by applying the deformation vector field converted into the high resolution to the first medical use image.

In an attempt to generate the second medical use image while the first medical use image has the high resolution, it may be difficult to generate the deformation vector field. Even in such a case, in the fourth aspect, the deformation vector field is generated from the first medical use image converted into the low resolution, and the deformation vector field is converted into the high resolution, so that the second medical use image having the high resolution can be generated while avoiding the difficulty. The degree of the conversion of the resolution can be determined according to the processing load or the resolution of the medical use image finally required.

A fifth aspect relates to the medical use image processing method according to any one of the first to fourth aspects, in which the processor receives a CT image in which a decubitus posture is the first posture as the first medical use image in the reception step, and generates a CT image in which a standing posture is the second posture as the second medical use image in the image generation step. The fifth aspect defines one aspect of the first and second postures and the first and second medical use images.

A sixth aspect relates to the medical use image processing method according to any one of the first to fifth aspects, in which the processor further executes a modality conversion step of converting the second medical use image generated in a pseudo manner into a third medical use image having a modality different from the second medical use image in a pseudo manner. The modality conversion can be performed, for example, from the CT image to an X-ray image or vice versa.

A seventh aspect relates to the medical use image processing method according to the sixth aspect, in which, in the modality conversion step, the processor generates an X-ray fluoroscopic image in the second posture as the third medical use image.

An eighth aspect relates to the medical use image processing method according to any one of the first to seventh aspects, in which, in the image generation step, the processor converts first label data corresponding to the first medical use image into second label data corresponding to the second medical use image by using the deformation vector field. According to the eighth aspect, the deformation vector field can be used to perform the conversion of the label data in addition to the generation of the second medical use image. The label data is, for example, a segmentation label (label attached to an organ).

A ninth aspect relates to the medical use image processing method according to any one of the first to eighth aspects, in which the processor receives a T1 enhancement MR image and a T2 enhancement MR image in which at least one of a standing posture or a decubitus posture is the first posture as the first medical use image in the reception step, and generates a T1 enhancement MR image and a T2 enhancement MR image in which the other of the standing posture or the decubitus posture is the second posture in a pseudo manner in the image generation step. The ninth aspect defines the conversion between MR images in different postures. The MR image is an image acquired by a magnetic resonance (MR) apparatus.

A tenth aspect relates to the medical use image processing method according to any one of the first to eighth aspects, in which the processor receives a chest CT image in which at least one of an expiratory posture or an inspiratory posture is the first posture as the first medical use image in the reception step, and generates a chest CT image in which the other of the expiratory posture or the inspiratory posture is the second posture in a pseudo manner in the image generation step. The tenth aspect defines the conversion between the chest CT images in different postures in view of a change in a shape or the like of a lung between the expiratory posture and the inspiratory posture.

In order to achieve the object described above, an eleventh aspect of the present invention relates to a medical use image processing program causing a processor of a medical use image processing device to execute steps of a medical use image processing method, the steps comprising a reception step of receiving input of a first medical use image actually captured in a first posture, and an image generation step of generating a second medical use image, in which the same portion as the first medical use image is imaged in a second posture different from the first posture, from the first medical use image in a pseudo manner, in which the second medical use image is generated by using a deformation vector field that converts the first medical use image into the second medical use image. According to the eleventh aspect, the domain shift can be reduced as in the first aspect. It should be noted that the medical use image processing method executed by the medical use image processing program according to the aspect of the present invention may have the same configurations as configurations of the second to tenth aspects. In addition, a non-transitory recording medium in which a computer-readable code of the medical use image processing program described above is recorded can also be used as an aspect of the present invention.

In order to achieve the object described above, a twelfth aspect of the present invention relates to a medical use image processing device comprising a processor, in which the processor executes reception processing of receiving input of a first medical use image actually captured in a first posture, and image generation processing of generating a second medical use image, in which the same portion as the first medical use image is imaged in a second posture different from the first posture, from the first medical use image in a pseudo manner, in which the second medical use image is generated by using a deformation vector field that converts the first medical use image into the second medical use image. According to the twelfth aspect, the domain shift can be reduced as in the first and twelfth aspects. It should be noted that the medical use image processing device according to the aspect of the present invention may have the same configurations as configurations of the second to tenth aspects.

In order to achieve the object described above, a thirteenth aspect of the present invention relates to a learning method of a medical use image processing device including a generation unit that receives input of a first medical use image actually captured in a first posture, and that generates a second medical use image, in which the same portion as the first medical use image is imaged in a second posture different from the first posture, from the first medical use image in a pseudo manner, the generation unit generating the second medical use image by using a deformation vector field that converts the first medical use image into the second medical use image, and an identification unit that receives input of the second medical use image and a fourth medical use image in which the same portion as the first medical use image is actually imaged in the second posture, and that identifies whether an input medical use image is the second medical use image or the fourth medical use image, the learning method comprising a generation unit learning step of updating a generation parameter used by the generation unit to generate the deformation vector field such that an identification error of the identification unit is maximized while maintaining a parameter of the identification unit without updating, and an identification unit learning step of updating the parameter of the identification unit such that the identification error of the identification unit is minimized while maintaining the generation parameter of the generation unit without updating. The thirteenth aspect defines the learning method (machine learning method) of generating the deformation vector field, and in each of the aspects of the present invention, the deformation vector field generated by this method can be used.

A fourteenth aspect relates to the learning method according to the thirteenth aspect, in which a step of smoothing the generated deformation vector field by inputting the first medical use image to the generation unit and adding a constraint to the generation parameter is provided in the generation unit learning step. According to the fourteenth aspect, a smooth second medical use image can be generated by smoothing the deformation vector field. In the fourteenth aspect, the "constraint" may be, for example, a constraint on a change in a direction or a magnitude of adjacent deformation vectors.

A fifteenth aspect relates to the learning method according to the thirteenth or fourteenth aspect, in which the generation unit learning step and the identification unit learning step are performed by inputting the first medical use image to the generation unit and inputting the fourth medical use image to the identification unit. The fifteenth aspect defines one aspect of the medical use image used for learning.

A sixteenth aspect relates to the learning method according to the fifteenth aspect, in which the first medical use image and the fourth medical use image are medical use images for the same portion of different subjects. In general, it is rare to acquire images of the same portion of the same subject in different postures, so that the sixteenth aspect defines the learning method in such a case.

A seventeenth aspect relates to the learning method according to any one of the thirteenth to sixteenth aspects, in which the generation unit and the identification unit are configured by a neural network. The seventeenth aspect defines one aspect of the generation unit and the identification unit.

It should be noted that a program (learning program) causing the medical use image processing device to execute the learning method according to the thirteenth to seventeenth aspects, and a non-transitory recording medium in which a computer-readable code of the program is recorded can also be used as one aspect of the present invention.

As described above, with the medical use image processing method, the medical use image processing program, the medical use image processing device, and the learning method of the medical use image processing device according to the aspects of the present invention, the domain shift can be reduced.

BRIEF DESCRIPTION OF THE DRAWINGS

FIG. 3 is a diagram showing a state of a generation unit learning step.

FIG. 5 is a diagram showing a state of an identification unit learning step.

FIG. 8 is a diagram showing conversion of the label data using the deformation vector field.

FIG. 11 is a diagram showing a state of learning (execution of a learning method) in the second embodiment.

FIG. 17 is a diagram showing a modification example of a configuration of a medical use image processing device.

DESCRIPTION OF THE PREFERRED EMBODIMENTS

Embodiments of a medical use image processing method, a medical use image processing program, a medical use image processing device, and a learning method according to the present invention will be described. In the description, the accompanying drawings will be referred to, as required. It should be noted that, in the accompanying drawings, the description of some components may be omitted for convenience of description.

First Embodiment

[Configuration of Medical Use Image Processing Device]

Figure 1:
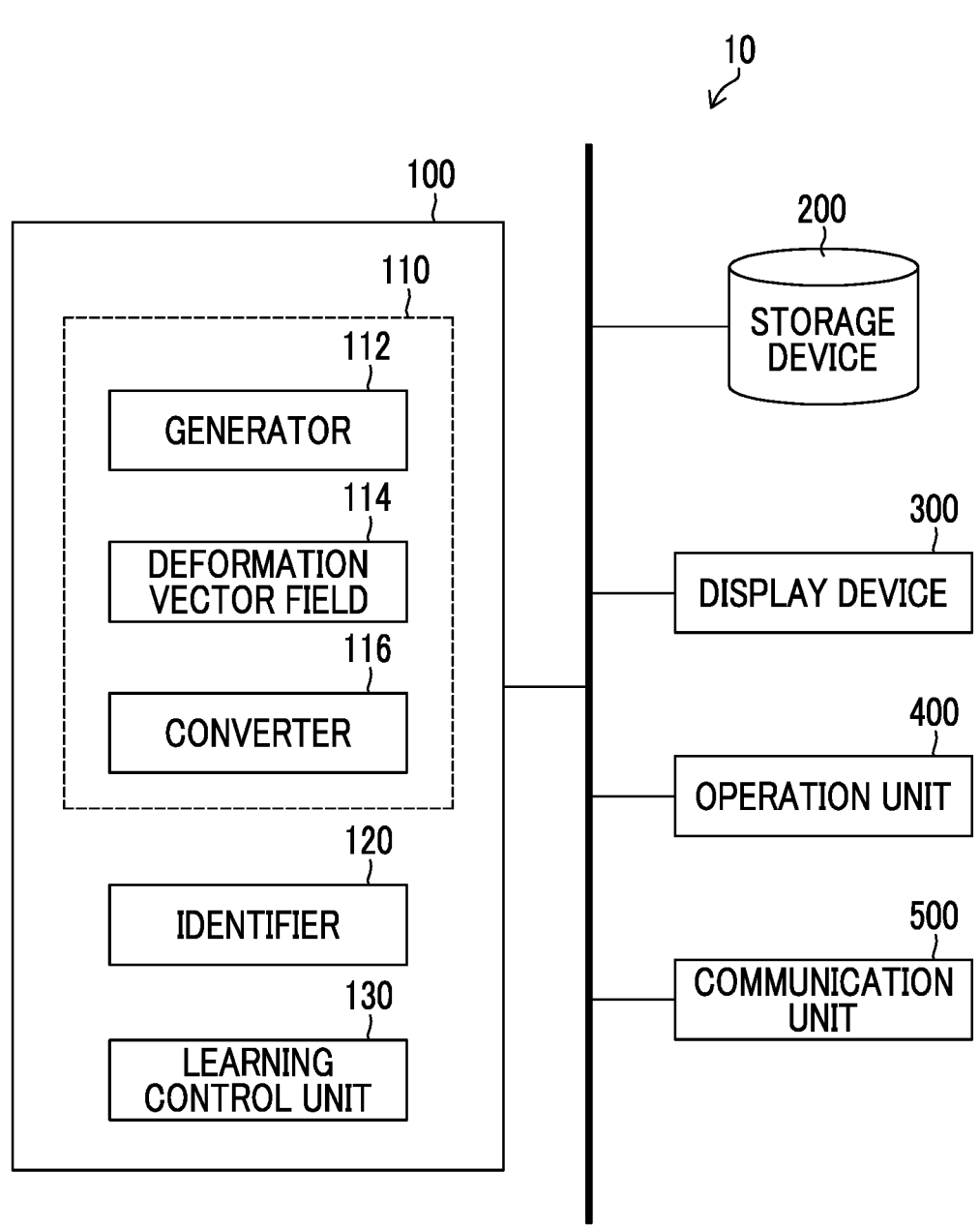
FIG. 1 is a diagram showing a schematic configuration of a medical use image processing device according to a first embodiment.

FIG. 1 is a diagram showing a schematic configuration of a medical use image processing device 10 (medical use image processing device) according to a first embodiment. The medical use image processing device 10 comprises an image processing unit 100 (generation unit, identification unit, deformation vector field, learning control unit, projection unit, and processor), a storage device 200, a display device 300, an operation unit 400, and a communication unit 500. The connection between these components may be wired or wireless. Also, these components may be stored in a single housing or may be separately stored in a plurality of housings.

[Configuration of Image Processing Unit]

As shown in FIG. 1, the image processing unit 100 (processor) comprises a generation unit 110 (generation unit), an identifier 120 (identification unit), and a learning control unit 130. The generation unit 110 comprises a generator 112 (generator), a deformation vector field 114 (deformation vector field), and a converter 116. The generator 112 is a network that receives input of a medical use image (first medical use image) and generates a deformation vector field, and can be configured by using a neural network, such as U-Net used in pix2pix, for example. In addition, a deep residual network (ResNet) based neural network can also be used (see "Perceptual Losses for Real-Time Style Transfer and Super-Resolution", ECCV, 2016, Justin Johnson et al., [search on Dec. 8, 2020], the Internet (https://arxiv.org/abs/1603.08155)). As long as a network structure used in the field of super-resolution is used, it can be basically applied to the present invention.

Figure 2A:
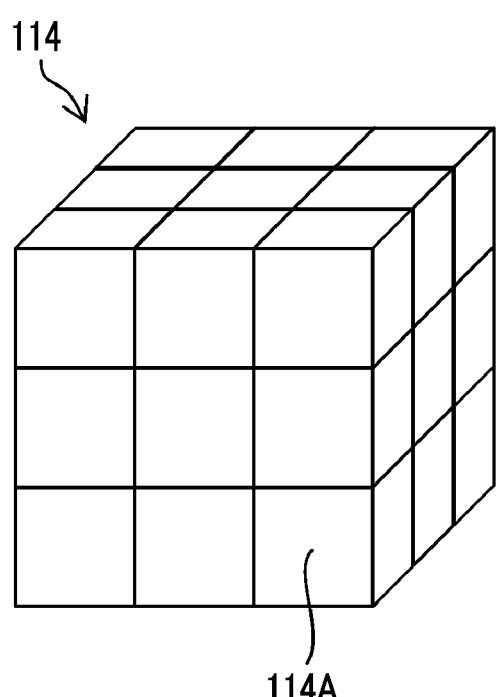
FIGS. 2A and 2B are diagrams schematically showing a deformation vector field.
Figure 2B:
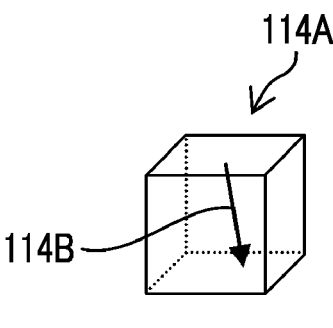

The deformation vector field 114 (deformation vector field) is a set of three-dimensional vectors (vectors indicating a direction of deformation and a deformation amount) that deform each of the voxels of the input medical use image (in a case of the three-dimensional image) to each of the voxels of the output medical use image. FIGS. 2A and 2B are diagrams schematically showing a deformation vector. FIG. 2A shows an entire deformation vector field (deformation vector field 114), and a deformation vector 114B is present to correspond to each small region 114A of the deformation vector field 114 as shown in FIG. 2B. It should be noted that, in a case of a two-dimensional image, the deformation vector field is a set of two-dimensional vectors (vectors indicating a direction of deformation and a deformation amount) that deform each of the pixels of the input medical use image to each of the pixels of the output medical use image.

The converter 116 generates a second medical use image (medical use image in which the same portion as the first medical use image is imaged in a second posture different from a first posture) in a pseudo manner by applying the deformation vector field 114 to the input medical use image (first medical use image captured in the first posture) (image generation processing and image generation step). It should be noted that the term "the same" portion includes a case in which at least a part of the portion is common as well as a case in which the portions are completely the same in the first medical use image and the second medical use image (the same applies to each of the following aspects).

The identifier 120 (identification unit) identifies whether the input medical use image (second medical use image and fourth medical use image) is the medical use image (fourth medical use image) that is actually captured or the medical use image (second medical use image) generated in a pseudo manner by the generation unit 110. Similarly to the generator 112, a patch identifier used in pix2pix can be used as the identifier 120.

The learning control unit 130 updates parameters of the generator 112 and the identifier 120 based on the identification result of the identifier 120 (generation unit learning step and identification unit learning step). That is, the generator 112 and the identifier 120 are trained (configured) through machine learning. It should be noted that the details of updating the parameters (each step of the learning method) of the generator 112 and the identifier 120 will be described later.

The functions of the image processing unit 100 can be realized by using various processors and a recording medium. The various processors also include, for example, a central processing unit (CPU), which is a general-purpose processor that executes software (program) to realize various functions, a graphics processing unit (GPU), which is a processor specialized in image processing, and a programmable logic device (PLD), which is a processor of which a circuit configuration can be changed after manufacturing, such as a field programmable gate array (FPGA). Each of the functions may be realized by one processor, or may be realized by a plurality of processors of the same type or different types (for example, a plurality of FPGAs, a combination of the CPU and the FPGA, or a combination of the CPU and the GPU). Also, a plurality of the functions may be realized by one processor. The hardware structures of these various processors are, more specifically, an electric circuit (circuitry) in which the circuit elements, such as semiconductor elements, are combined.

In a case in which the processor or the electric circuit executes software (program), a code readable by a computer (for example, various processors or electric circuits constituting the image processing unit 100 and/or a combination thereof) of the executed software is stored in a non-transitory recording medium (memory), such as a flash memory or a read only memory (ROM), and the computer refers to the software. The program to be executed includes a program (medical use image processing program and learning program) that executes a method (medical use image processing method and learning method) according to one aspect of the present invention. In addition, in a case in which the software is executed, information (medical use image or the like) stored in the storage device 200 is used as required. Further, in a case of the execution, for example, a random access memory (RAM) is used as a transitory storage region.

The image processing unit 100 may comprise a display control unit and an image acquisition unit (not shown) in addition to the components described above.

[Information Stored in Storage Device]

The storage device 20 is configured by various magneto-optical recording media or semiconductor memories, and a control unit thereof, and stores the medical use image that is actually captured or the medical use images (first to fourth medical use images) generated in a pseudo manner, the software (program) executed by the processor, and the like.

[Configuration of Display Device, Operation Unit, and Communication Unit]

The display device 300 is configured by a device, such as a liquid crystal monitor, and can display data, such as the medical use image. In addition, the operation unit 400 is configured by a mouse, a keyboard, or the like (not shown), and a user can give an instruction required for executing the medical use image processing method or the learning method via the operation unit 400. The user can give the instruction via a screen displayed on the display device 300. The display device 300 may be configured by a touch panel type monitor, and the user may give the instruction via the touch panel. The communication unit 500 can acquire the medical use image and other information from another system connected via the network.

[Learning Method of Medical Use Image Processing Device]

Next, the learning method (machine learning method) of the medical use image processing device 10 will be described. The learning is divided into the generation unit learning step of updating the parameter (generation parameter) of the generator 112 and the identification unit learning step of updating the parameter of the identifier 120.

[Learning of Generator (Generation Unit)]

Figure 3:
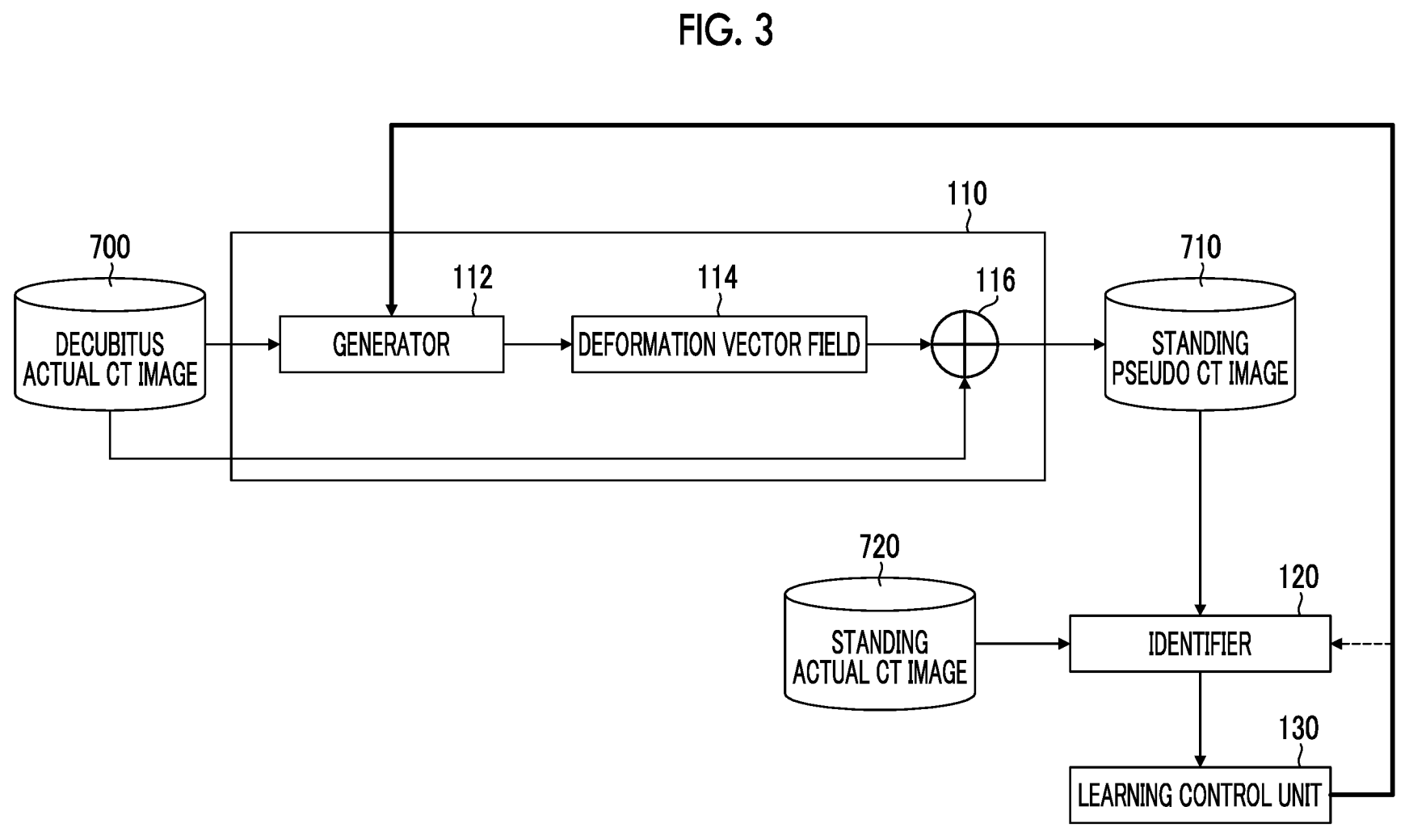

FIG. 3 is a diagram showing a state of the generation unit learning step. The generator 112 (generation unit 110 and processor) receives input of the first medical use image (medical use image for learning) actually captured in the first posture (reception step and reception processing). Here, a CT image (decubitus actual CT image 700) in which a portion (for example, the chest) of a subject is actually imaged in the decubitus posture (example of the "first posture") is referred to as the "first medical use image". The "decubitus posture" may be a supine posture or a prone posture. The generator 112 outputs the deformation vector field 114 in a case in which the first medical use image is input, and the converter 116 (generation unit 110 and processor) applies the deformation vector field 114 to the decubitus actual CT image 700 (first medical use image) to generate a standing pseudo CT image 710 (second medical use image) in which the same portion as the decubitus actual CT image 700 is imaged in the standing posture (example of the "second posture different from the first posture") in a pseudo manner (image generation step and image generation processing). It should be noted that a noise component (for example, random noise) may be added to the generator 112 to impart randomness to the generated medical use image (the same applies to each of the following embodiments).

Figure 4A:
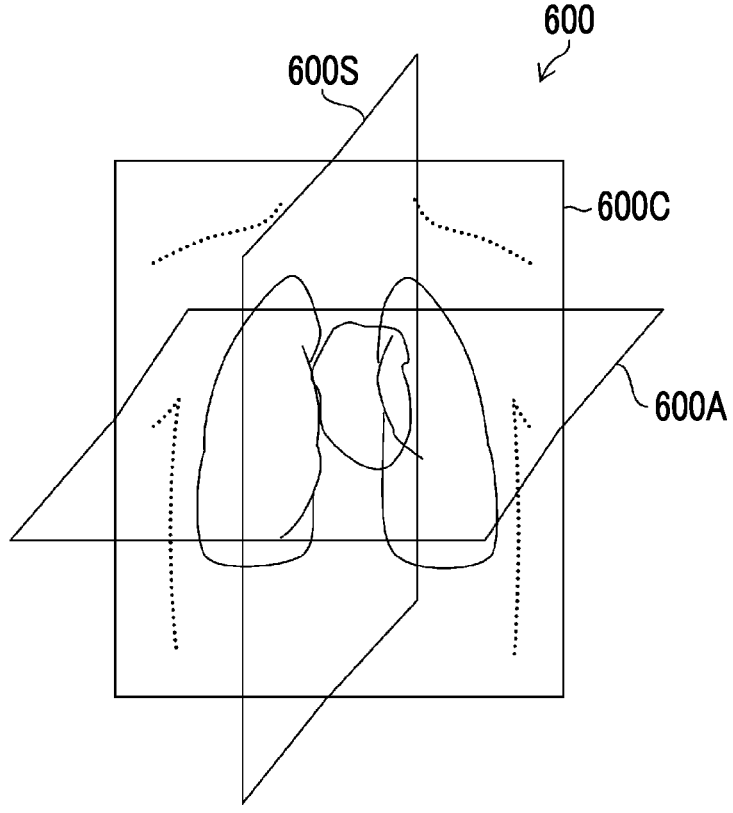
FIGS. 4A and 4B are diagrams schematically showing standing and decubitus three-dimensional CT images.
Figure 4B:
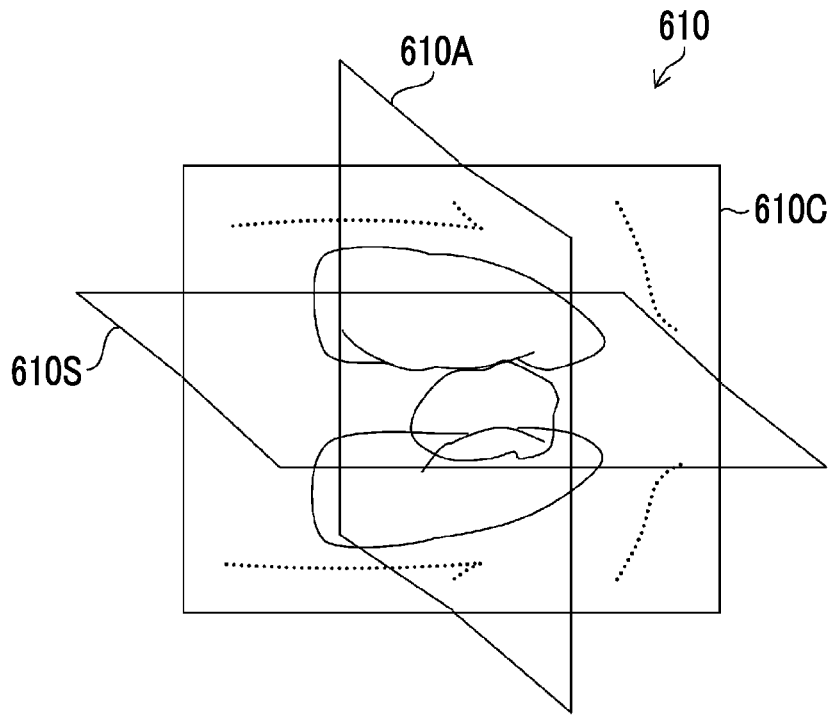

FIGS. 4A and 4B are diagrams schematically showing standing and decubitus three-dimensional CT images. FIG. 4A shows a standing CT image 600, and FIG. 4B shows a decubitus CT image 610. In FIG. 4A, cross sections 600S, 600C, and 600A are cross sections in a sagittal direction, a coronal direction, and an axial direction, respectively. Similarly, in FIG. 4B, cross sections 610S, 610C, and 610A are cross sections in the sagittal direction, the coronal direction, and the axial direction, respectively.

The identifier 120 (identifier and identification unit) receives input of the standing pseudo CT image 710 that is generated in a pseudo manner and a standing actual CT image 720 (fourth medical use image), which is the medical use image in which the same portion as the decubitus actual CT image 700 (first medical use image) is actually imaged in the standing posture (second posture), and identifies whether the input medical use image is the standing pseudo CT image 710 (second medical use image) or the standing actual CT image 720 (fourth medical use image). For example, the identifier 120 outputs the probability that the input medical use image is the standing pseudo CT image 710 and/or the probability that the input medical use image is the standing actual CT image 720 (one aspect of the identification result).

It should be noted that the decubitus actual CT image 700 (first medical use image) and the standing actual CT image 720 (fourth medical use image) may be medical use images for the same portion of different subjects, instead of the medical use images for the same subject. The reason is that, in general, it is rare to actually acquire images in different postures for the same portion of the same subject. According to the present embodiment, the learning can be performed even in a case in which the subject is different between the decubitus actual CT image 700 and the standing actual CT image 720.

The learning control unit 130 (processor) updates the generation parameter (parameter used by the generator 112 to generate the deformation vector field 114) such that an identification error of the identifier 120 is maximized while maintaining the parameter of the identifier 120 without updating, based on the identification result (generation unit learning step). It should be noted that the fact that the input to the identifier 120 is shown by a dotted line in FIG. 3 indicates that the parameter of the identifier 120 is maintained without updating.

[Learning of Identifier (Identification Unit)]

Figure 5:
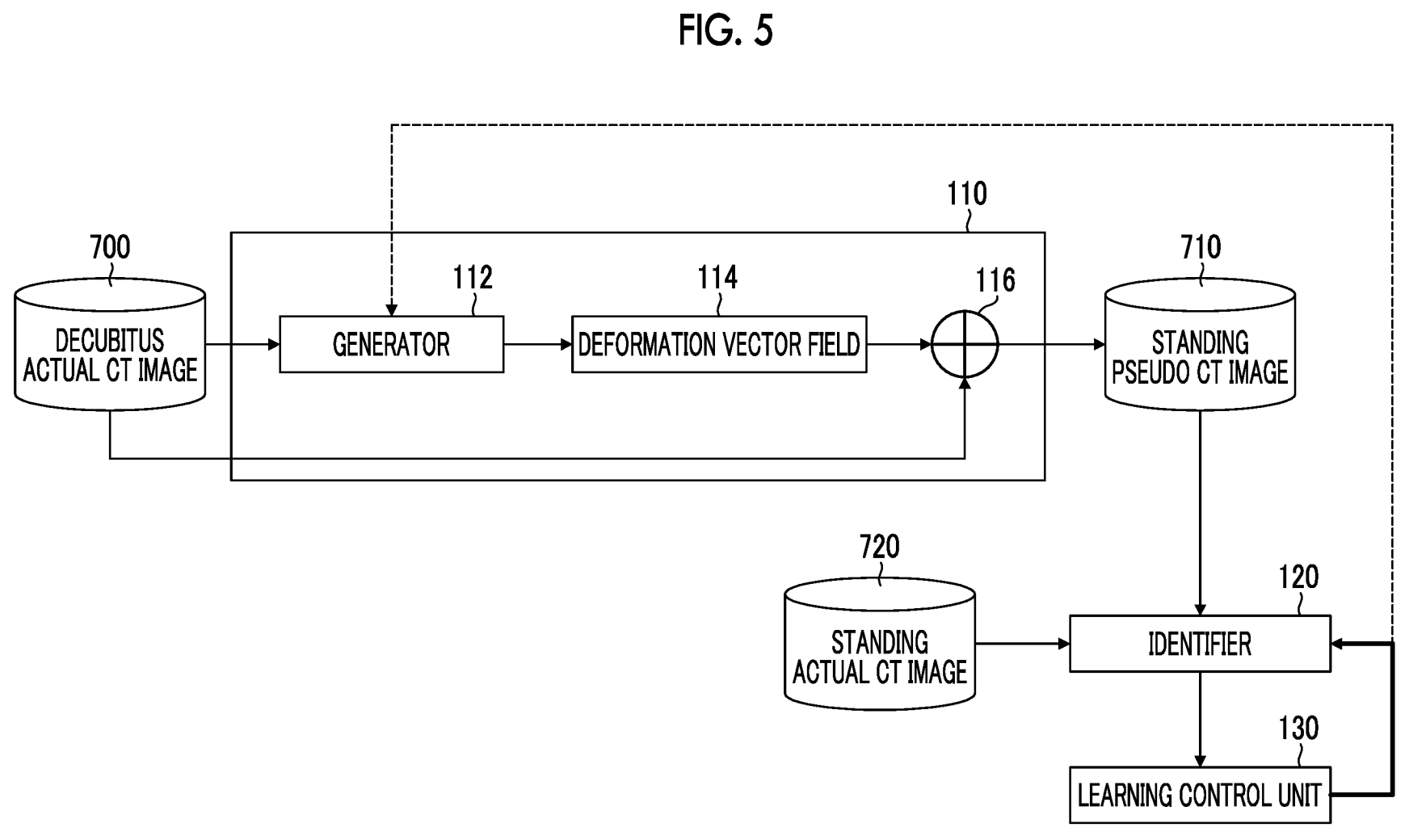

FIG. 5 is a diagram showing a state of the identification unit learning step. In the identification unit learning step as well, similarly to the generation unit learning step described above, the standing pseudo CT image 710 (second medical use image) is generated in a pseudo manner (image generation step and image generation processing), and the identifier 120 identifies whether the input medical use image is the standing pseudo CT image 710 or the standing actual CT image 720. The learning control unit 130 (processor) updates the parameter of the identifier 120 such that the identification error of the identifier 120 is minimized while maintaining the generation parameter of the generator 112 without updating, based on the identification result (identification unit learning step). It should be noted that the fact that the input to the generator 112 is shown by a dotted line in FIG. 5 indicates that the parameter of the generator 112 is maintained without updating.

The learning described above may be terminated after performing the generation unit learning step and the identification unit learning step a predetermined number of times, or may be terminated after the fluctuations in the parameters of the generator 112 and the identifier 120 converge. In addition, the learning control unit 130 (processor) may alternately (sequentially) perform the generation unit learning step and the identification unit learning step, or may repeat the generation unit learning step and the identification unit learning step in batch units or mini-batch units. In addition, the image processing unit 100 may display a process of the learning (for example, a state of a change in the parameter) on the display device 300.

[Smoothing of Deformation Vector Field]

It should be noted that, in the generation unit learning step, the image processing unit 100 (processor) may perform smoothing on the deformation vector field to be generated, by inputting the decubitus actual CT image (first medical use image) to the generator 112 and adding a constraint on the generation parameter (smoothing step).

[Conversion of Medical Use Image Using Deformation Vector Field]

Figure 6:
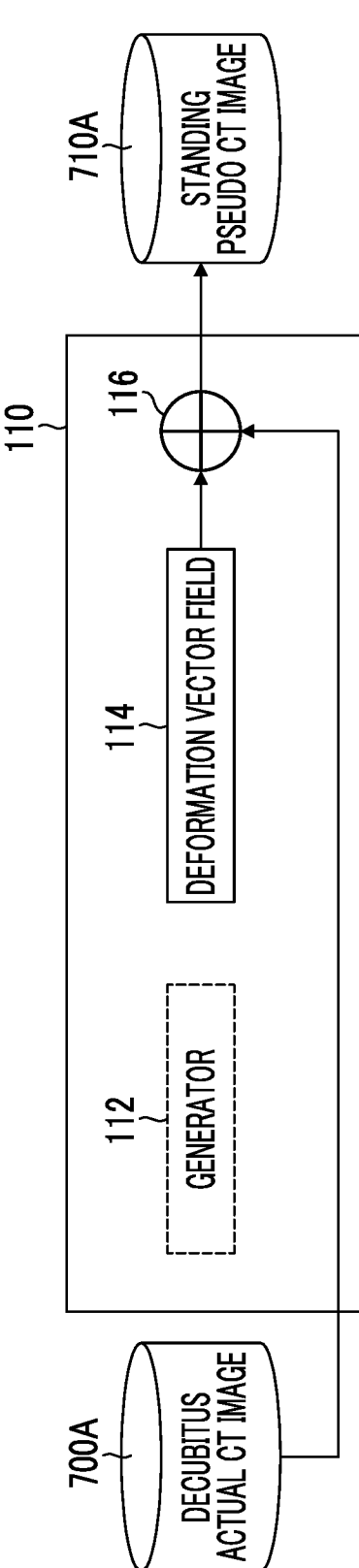
FIG. 6 is a diagram showing a state of conversion of a medical use image using the deformation vector field.

FIG. 6 is a diagram showing a state of the conversion of the medical use image using the deformation vector field. After the deformation vector field 114 is obtained by the learning method described above, the converter 116 (processor) applies the deformation vector field 114 to a decubitus actual CT image 700A (first medical use image) to generate a standing pseudo CT image 710A (second medical use image). The input decubitus actual CT image 700A and/or standing pseudo CT image 710A may be displayed on the display device 300 or stored in the storage device 200 by the image processing unit 100 (according to the operation of the user via the operation unit 400 or automatically).

As described above, according to the first embodiment, since the standing pseudo CT image (second medical use image) is generated from the decubitus actual CT image 700 (first medical use image) by using the deformation vector field 114 instead of directly converting the medical use images to each other, the domain shift can be reduced.

[Conversion of Label Data Using Deformation Vector Field]

Figure 7:
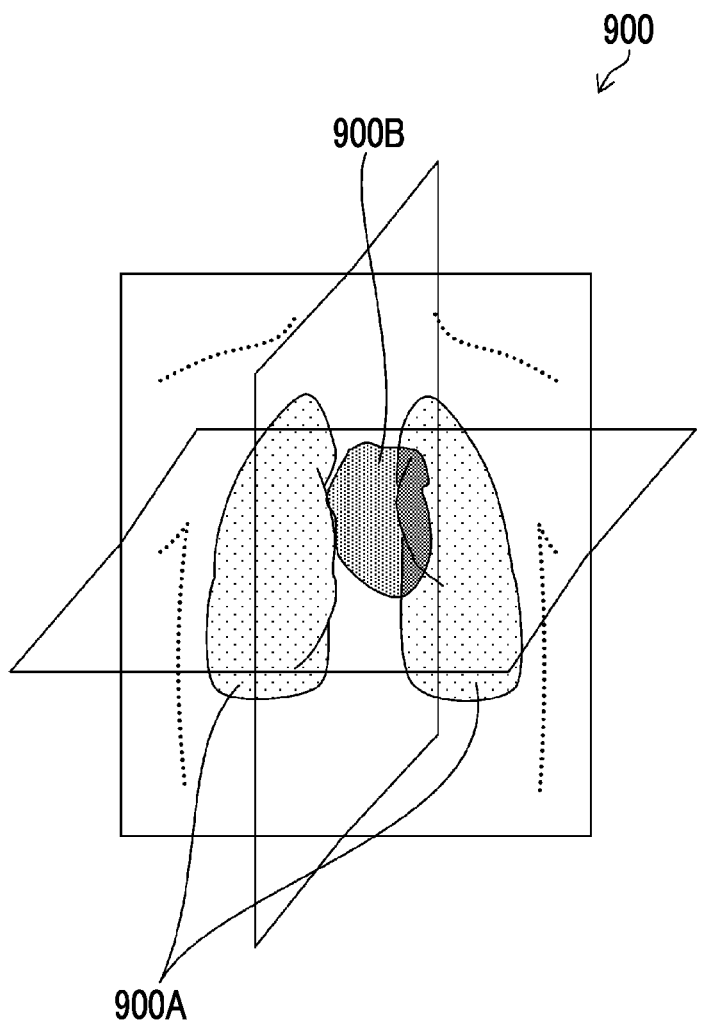
FIG. 7 is a diagram schematically showing label data corresponding to the three-dimensional CT image.
Figure 8:
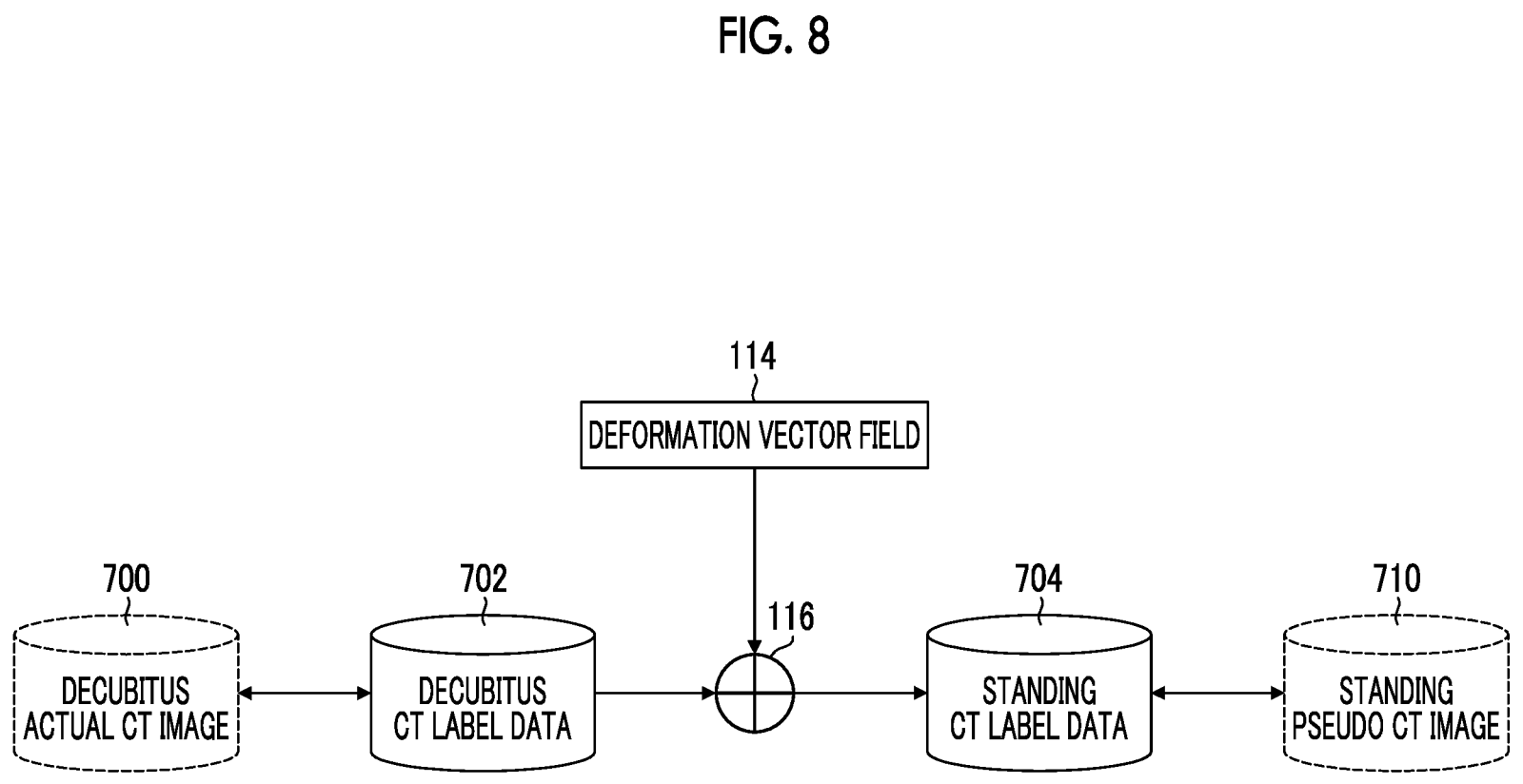

According to the first embodiment, it is also possible to convert label data in a certain posture into label data in a different posture by using the deformation vector field 114 generated by the learning method described above. For example, as schematically shown in FIG. 7, the label data is data to which a segmentation label is attached for each organ (lung 900A and heart 900B in the example of FIG. 7) corresponding to the medical use image 900 (three-dimensional CT image in the example of FIG. 7) acquired in a certain posture (for example, decubitus posture). In a case in which such label data is converted, as shown in FIG. 8, the image processing unit 100 (processor) generates a standing CT label data 704 (second label data) corresponding to the standing pseudo CT image 710 (second medical use image) by applying the deformation vector field 114 to decubitus CT label data 702 (first label data) corresponding to the decubitus actual CT image 700 (first medical use image). The input decubitus CT label data 702 and/or standing CT label data 704 may be displayed on the display device 300 or stored in the storage device 200 by the image processing unit 100 (according to the operation of the user via the operation unit 400 or automatically), similarly to the medical use image.

[Variation of Medical Use Images]

In the first embodiment described above, the standing medical use image (standing pseudo CT image) is generated from the decubitus medical use image (decubitus actual CT image 700), but the relationship between the postures of the input medical use image and the medical use image to be generated is not limited to such an aspect. In addition to the aspect described above, a decubitus image may be generated from a standing image. Further, the image to be used may be an X-ray image or an MR image. For example, the image processing unit 100 (processor) may receive a T1 enhancement MR image and a T2 enhancement MR image in which at least one of the standing posture or the decubitus posture is the first posture as the first medical use image in the reception step (reception processing), and may generate a T1 enhancement MR image and a T2 enhancement MR image in which the other of the standing posture or the decubitus posture is the second posture in a pseudo manner in the image generation step. In addition, the image processing unit 100 (processor) may receive a chest CT image in which at least one of an expiratory posture or an inspiratory posture is the first posture as the first medical use image in the reception step (reception processing), and may generate a chest CT image in which the other of the expiratory posture or the inspiratory posture is the second posture in a pseudo manner in the image generation step. Further, the portion to be imaged in the medical use image is not particularly limited. In addition, the medical use image is not limited to the three-dimensional image as in the aspect described above, and may be a two-dimensional image, such as an X-ray fluoroscopic image. In a case in which the two-dimensional image is used, a two-dimensional deformation vector field is used correspondingly.

Second Embodiment

Figure 9:
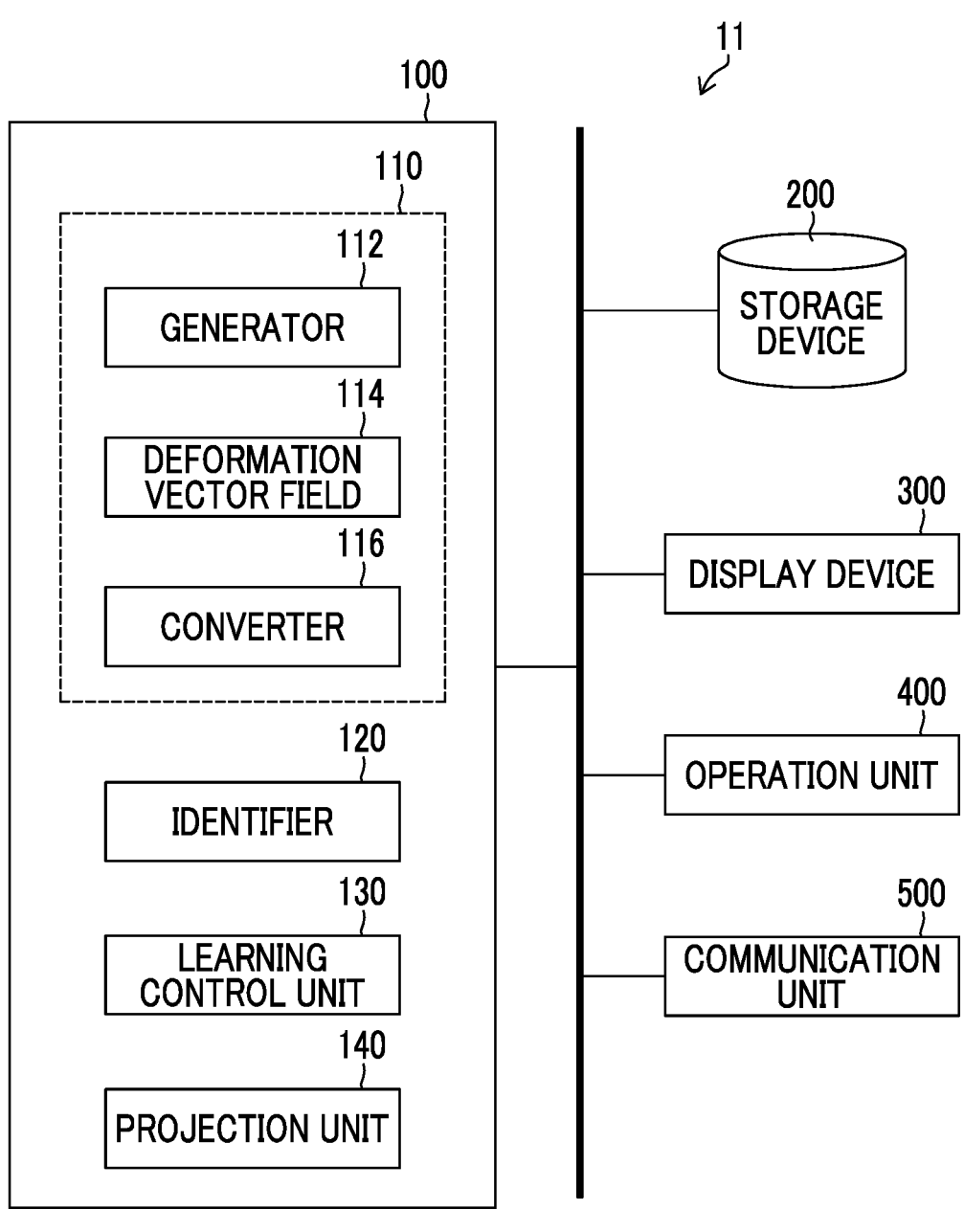
FIG. 9 is a diagram showing a schematic configuration of a medical use image processing device according to a second embodiment.
Figure 10:
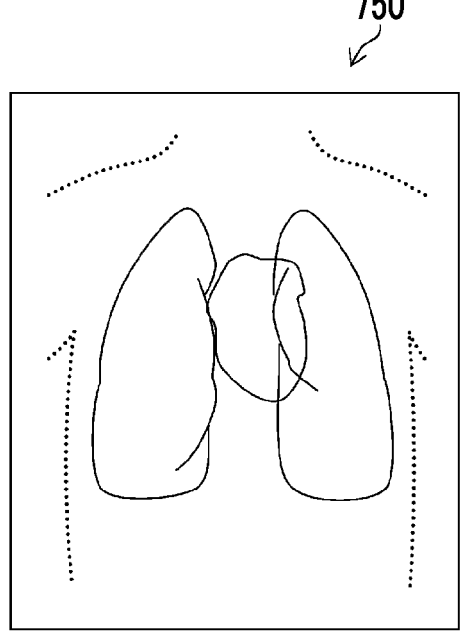
FIG. 10 is a diagram schematically showing an X-ray fluoroscopic image.

Hereinafter, a second embodiment of the present invention will be described. In the second embodiment, the modality conversion step (modality conversion processing) of converting the second medical use image, which is generated in a pseudo manner by the method described above, into the third medical use image having a modality different from second medical use image in a pseudo manner is further executed. FIG. 9 is a diagram showing a schematic configuration of a medical use image processing device 11 according to the second embodiment, and the medical use image processing device 11 comprises a projection unit 140. In the medical use image processing method, the medical use image processing device, and the medical use image processing program according to the embodiment of the present invention, the medical use image acquired in a certain modality may be converted into the medical use image having a different modality (modality conversion step may be executed) in a pseudo manner, and the projection unit 140 converts the CT image (second medical use image) into the X-ray fluoroscopic image (third medical use image) in a pseudo manner in the second embodiment. That is, the generation of the X-ray fluoroscopic image (two-dimensional image) by the projection of the CT image (three-dimensional volume data) is one aspect of the modality conversion, and the X-ray fluoroscopic image is one aspect of the third medical use image. FIG. 10 is a diagram schematically showing an X-ray fluoroscopic image 750.

It should be noted that the components of the medical use image processing device 11 other than the projection unit 140 are the same as components of the medical use image processing device 10 according to the first embodiment, and thus detailed description thereof will be omitted.

Figure 11:
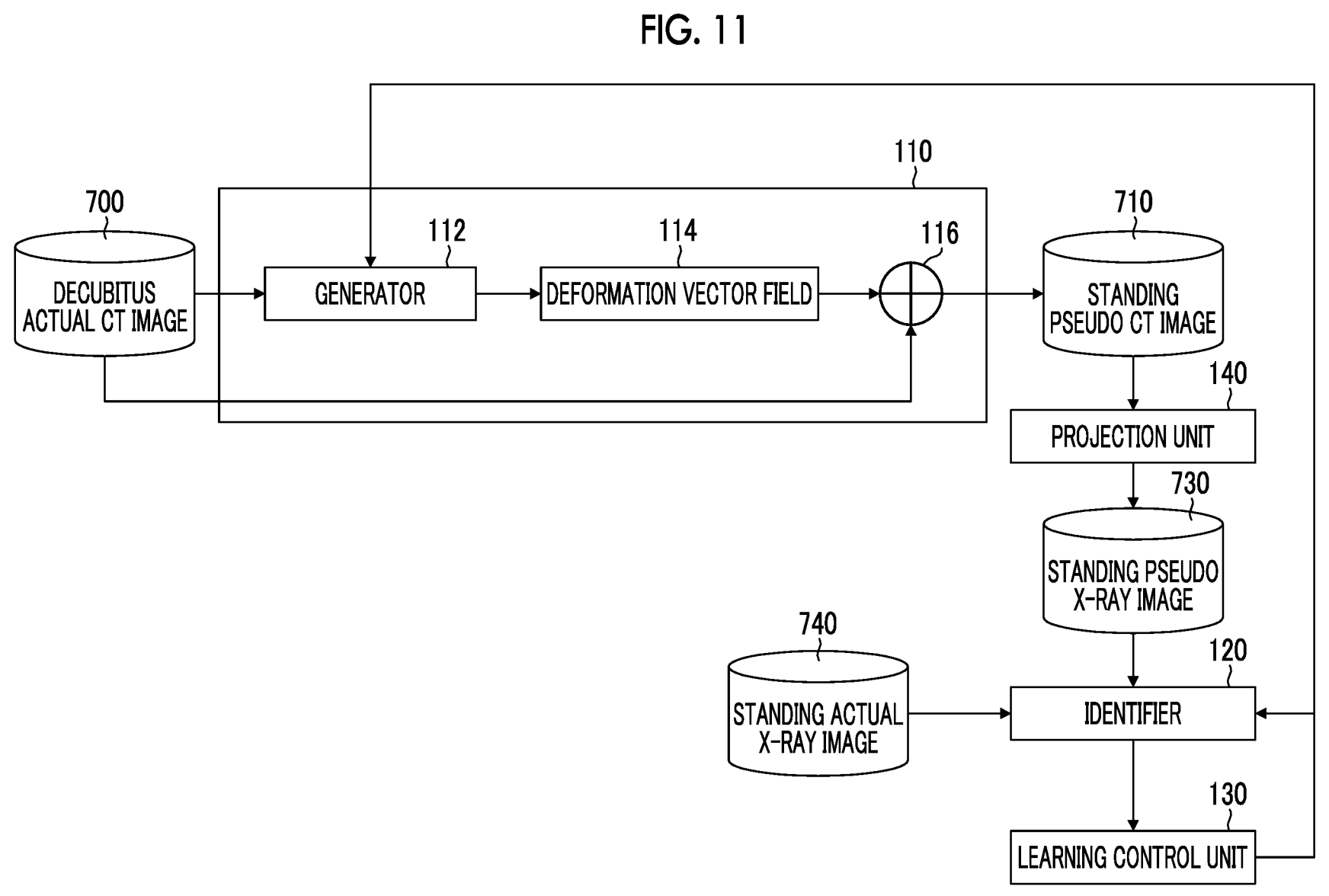

FIG. 11 is a diagram showing a state of learning (execution of the learning method) in the second embodiment. In the second embodiment, the projection unit 140 generates a standing pseudo X-ray image 730 (third medical use image) by converting the standing pseudo CT image 710 (second medical use image) in a pseudo manner (modality conversion step and modality conversion processing). Then, the identifier 120 (identifier and identification unit) receives input of the standing pseudo X-ray image 730 that is generated in a pseudo manner and a standing actual X-ray image 740 (fourth medical use image), which is the medical use image in which the same portion as the decubitus actual CT image 700 (first medical use image) is actually imaged in the standing posture (second posture), and identifies whether the input medical use image is the standing pseudo X-ray image 730 (second medical use image) or the standing actual X-ray image 740 (fourth medical use image). For example, the identifier 120 outputs the probability that the input medical use image is the standing pseudo X-ray image 730 and/or the probability that the input medical use image is the standing actual X-ray image 740 (one aspect of the identification result).

The learning control unit 130 (processor) updates the parameter of the generator 112 and the parameter of the identifier 120 based on the identification result (generation unit learning step and identification unit learning step). As described above for the first embodiment, the learning control unit 130 (processor) updates one of the parameters of the generator 112 or the parameter of the identifier 120 while maintaining the other thereof without updating. It should be noted that, in FIG. 11, for the sake of convenience, the point that one of the parameters is maintained without updating is not distinguished, and the generation unit learning step and the identification unit learning step are collectively shown in one figure, but the parameter is actually updated as a separate step as in the first embodiment (see FIGS. 4 and 5).

As described above, in the second embodiment as well, the domain shift can be reduced by using the deformation vector field as in the first embodiment. It should be noted that, in the second embodiment as well, the conversion of the medical use image, the conversion of the label data, the variation of the medical use image, and the like during the actual operation (during the inference) can be performed in the same manner as described above for the first embodiment. In addition, in the second embodiment as well, the modality may be converted as in the first embodiment.

Third Embodiment

Although the generator and the identifier are used in the embodiment described above, it is known that the learning may not be successful in a case in which the resolution of the image input to the generator is high (for example, see "Conditional Image Synthesis with Auxiliary Classifier GANs", Augustus Odena et al., [search on Dec. 8, 2020], the Internet (https://arxiv.org/abs/1610.09585) and "Progressive Growing of GANs for Improved Quality, Stability, and Variation", ICLR 2018, Tero Karras et al., [search on Dec. 8, 2020], the Internet (https://arxiv.org/abs/1710.10196)).

Figures 12, 13:
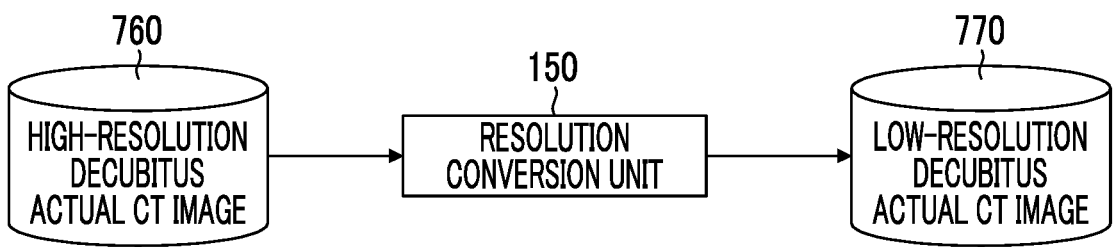
FIG. 12 is a diagram showing a schematic configuration of a medical use image processing device according to a third embodiment.
FIG. 13 is a diagram showing a state in which a high-resolution CT image is converted into a low resolution.

From such a viewpoint, in the third embodiment, the learning is performed after a resolution of the medical use image before conversion is converted. FIG. 12 is a diagram showing a schematic configuration of a medical use image processing device 12 (medical use image processing device) according to the third embodiment, and the medical use image processing device 12 comprises a resolution conversion unit 150 (processor). It should be noted that the components of the medical use image processing device 12 other than the resolution conversion unit 150 are the same as components of the medical use image processing device 10 according to the first embodiment, and thus detailed description thereof will be omitted.

Figure 14:
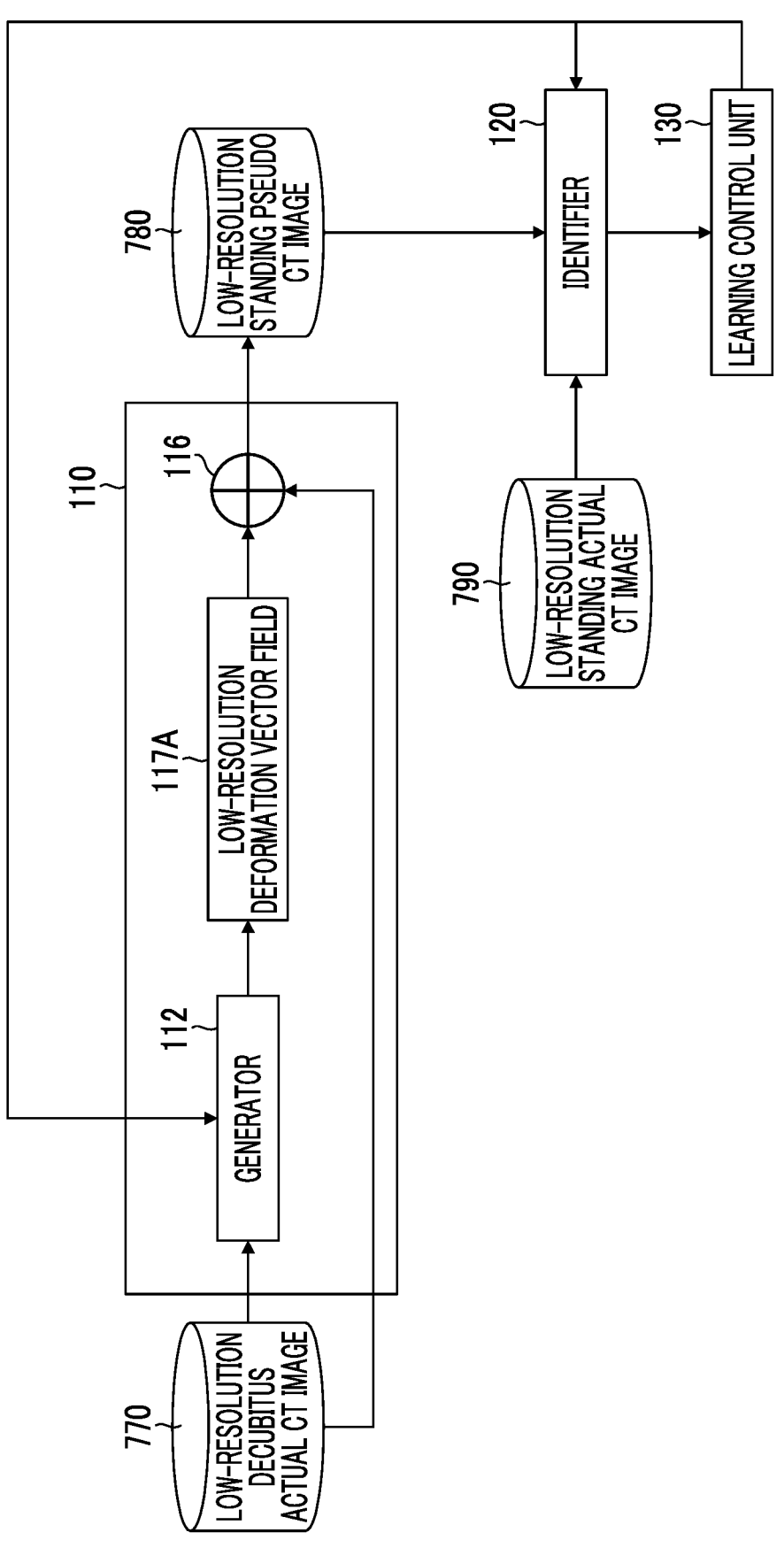
FIG. 14 is a diagram showing a state of learning using a low-resolution CT image.

In a case in which the learning and medical use image processing are performed by the medical use image processing device 12, for example, as shown in FIG. 13, a high-resolution decubitus actual CT image 760 (first medical use image) is converted into a low-resolution decubitus actual CT image 770 (first medical use image) by the resolution conversion unit 150 (image generation step and resolution conversion step). That is, a resolution of the low-resolution decubitus actual CT image 770 is lower than a resolution of the high-resolution decubitus actual CT image 760 which is the image before conversion. The resolution conversion unit 150 can convert the resolution by thinning out or averaging the voxels or the pixels. Then, as shown in FIG. 14, this low-resolution decubitus actual CT image is input to the generator 112 to generate a low-resolution deformation vector field 117A (deformation vector field) by machine learning. The learning procedure is the same as described above for the first and second embodiments, and the generation unit learning step of updating the parameter of the generator 112 and the identification unit learning step of updating the parameter of the identifier 120 are performed. It should be noted that the identifier 120 includes a low-resolution standing pseudo CT image 780 (second medical use image) generated in a pseudo manner by the generation unit 110 and a low-resolution standing actual CT image 790 (fourth medical use image) are input.

Figure 15:
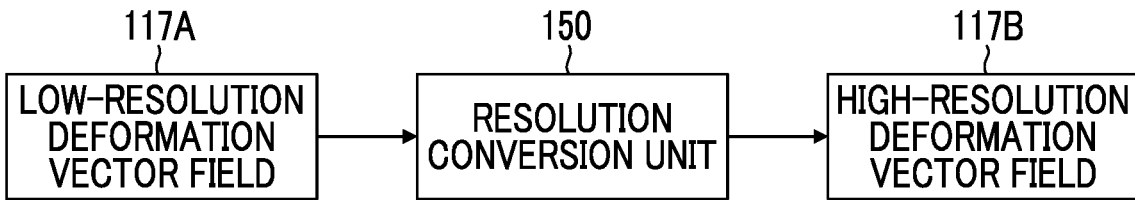
FIG. 15 is a diagram showing a state in which a resolution of the deformation vector field is converted.

As shown in FIG. 15, the resolution conversion unit 150 generates a high-resolution deformation vector field 117B (deformation vector field) from the low-resolution deformation vector field 117A generated by such learning by interpolation, enlargement, or the like (image generation step and resolution conversion step). That is, a resolution of the high-resolution deformation vector field 117B is higher than a resolution of the low-resolution deformation vector field 117A which is the deformation vector field before conversion.

Figure 16:
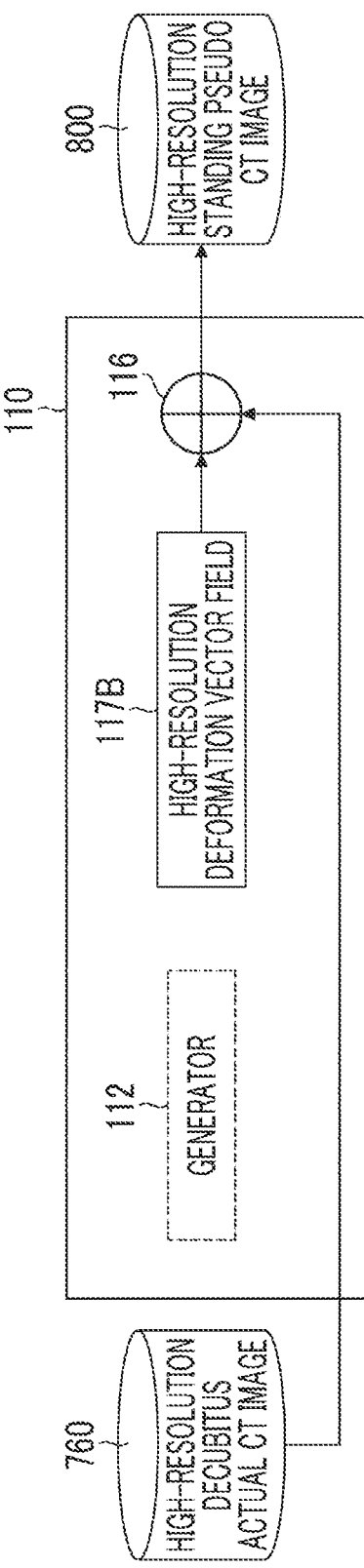
FIG. 16 is a diagram showing a state in which the medical use image is converted using the deformation vector field converted into a high resolution.

As shown in FIG. 16, the converter 116 (processor) generates a high-resolution standing pseudo CT image 800 (second medical use image) by applying the high-resolution decubitus actual CT image 760 to the high-resolution deformation vector field 117B obtained in this way (image generation step). According to the third embodiment, by performing such conversion of the resolution, a high-precision image can be generated while avoiding a problem in learning.

It should be noted that the conversion of the resolution may be performed according to the progress of learning. For example, in an initial stage of the learning, a high-resolution medical use image may be converted into a low resolution and used for learning, and the resolution of the medical use image used for learning may be increased as the learning progresses. In a case in which the resolution of the medical use image is changed in this way, it is preferable to change the resolution of the deformation vector field or the network configurations (for example, the number or size of convolutional layers) of the generator 112 and the identifier 120 correspondingly (see "Progressive Growing of GANs for Improved Quality, Stability, and Variation", ICLR 2018, Tero Karras et al., [search on Dec. 8, 2020], the Internet (https://arxiv.org/abs/1710.10196)).

In addition, the degree of the resolution of the original medical use image at which the conversion of the resolution is performed, and how low the resolution should be converted can be determined in consideration of the purpose of use of the medical use image, the processing load, and the like. The image processing unit 100 (processor) may receive a setting of a condition of the conversion of the resolution by the user via the operation unit 400 or the like, and may perform the processing described above based on the received condition. In addition, in the third embodiment as well, the conversion of the medical use image, the conversion of the label data, the variation of the medical use image, and the like during the actual operation (during the inference) can be performed in the same manner as described above for the first embodiment. In addition, in the third embodiment as well, the modality may be converted as in the first embodiment.

<Modification Example of Configuration of Medical Use Image Processing Device>

Figure 17:
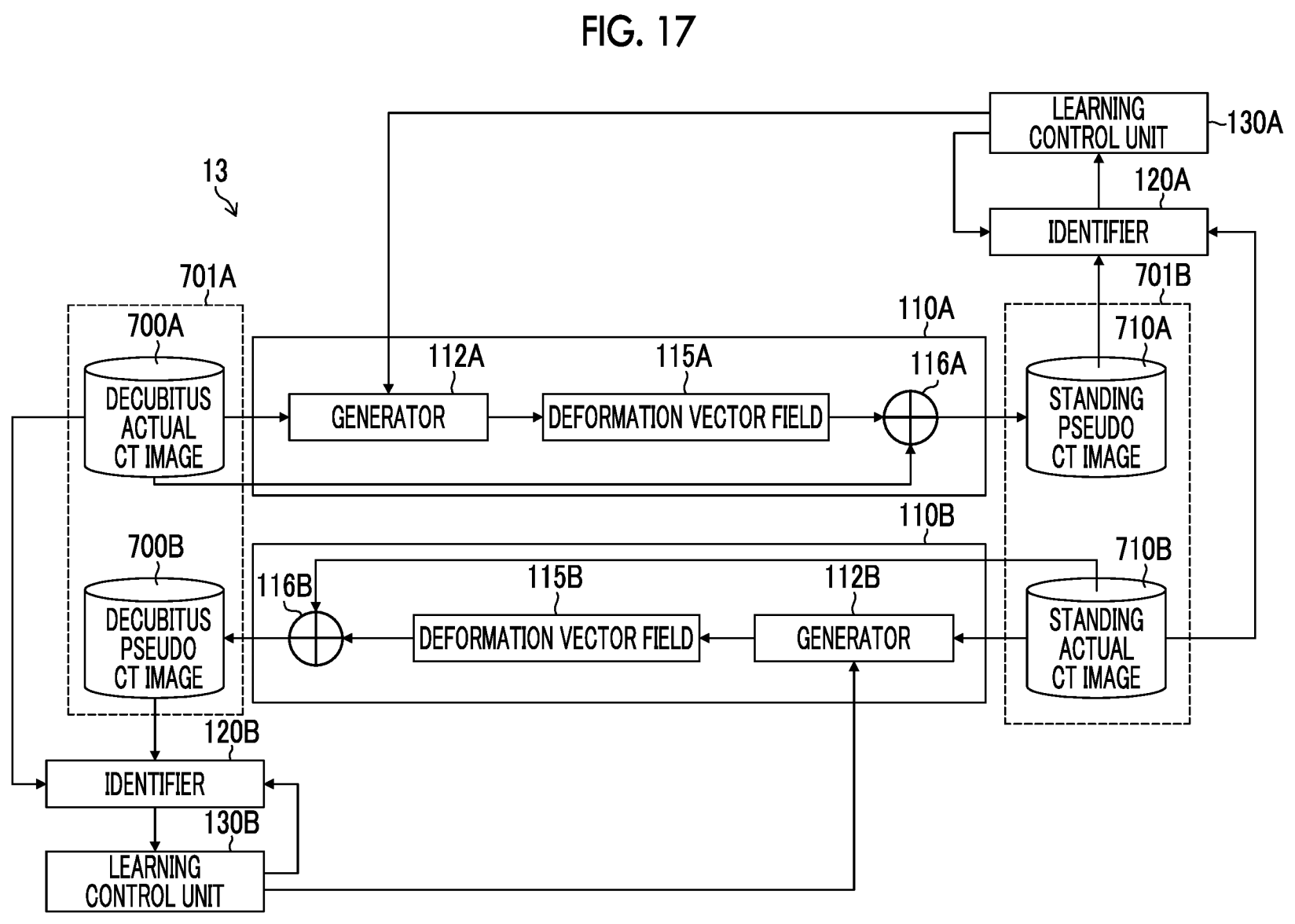

In the first to third embodiments described above, the aspect has been described in which the conversion of the posture is performed in one direction (specifically, the aspect in which the decubitus medical use image is converted into the standing medical use image), but an aspect may also be adopted in which the conversion of the posture is performed in both direction (specifically, an aspect in which both the conversion from the decubitus posture to the standing posture and the conversion from the standing posture to the decubitus posture) in the present invention. FIG. 17 is a diagram showing a modification example of the configuration of the medical use image processing device, and a medical use image processing device 13 (medical use image processing device) generates a standing pseudo CT image 710A (second medical use image) from a decubitus actual CT image 700A (first medical use image) in a pseudo manner by a generation unit 110A (generator 112A, deformation vector field 115A, and converter 116A; processor). Then, the standing pseudo CT image 710A and the standing actual CT image 710B are input to the identifier 120A to calculate the identification error. The learning control unit 130A (processor) updates the parameters of the generator 112A and the identifier 120A based on the calculated identification error in the same manner as described above for the first embodiment (generation unit learning step and identification unit learning step).

Similarly, a decubitus pseudo CT image 700B (second medical use image) is generated from the standing actual CT image 710B (first medical use image) in a pseudo manner by the generation unit 110B (generator 112B, deformation vector field 115B, and converter 116B; processor). Then, the decubitus pseudo CT image 700B and the decubitus actual CT image 700A (fourth medical use image) are input to the identifier 120B to calculate the identification error. The learning control unit 130B (processor) updates the parameters of the generator 112B and the identifier 120B based on the calculated identification error in the same manner as described above for the first embodiment (generation unit learning step and identification unit learning step).

It should be noted that, in a case in which the generator 112B and the identifier 120B are trained, the standing pseudo CT image 710A may be input instead of inputting the standing actual CT image 710B. Similarly, in a case in which the generator 112A and the identifier 120A are trained, the decubitus pseudo CT image 700B may be input instead of inputting the decubitus actual CT image 700A. The decubitus actual CT image 700A and the decubitus pseudo CT image 700B constitute a decubitus CT image domain 701A, and the standing pseudo CT image 710A and the standing actual CT image 710B constitute a standing CT image domain 701B. It should be noted that, as described above, the noise component may be input to the generators 112A and 112B.

It should be noted that, also in the modification example described above, as in the first to third embodiments described above, the conversion of the medical use image, the conversion of the label data, the variation of the medical use images, and the conversion of the modality during the actual operation (during the inference) may be performed.

The embodiments of the present invention have been described above, but the present invention is not limited to the aspects described above, and can have various modifications without departing from the gist of the present invention.

EXPLANATION OF REFERENCES

10: medical use image processing device
11: medical use image processing device
12: medical use image processing device
13: medical use image processing device
20: storage device
100: image processing unit
110: generation unit
110A: generation unit
110B: generation unit
112: generator
112A: generator
112B: generator
114: deformation vector field
114A: small region
114B: deformation vector
115A: deformation vector field
115B: deformation vector field
116: converter
116A: converter
116B: converter
117A: low-resolution deformation vector field
117B: high-resolution deformation vector field
120: identifier
120A: identifier
120B: identifier
130: learning control unit
130A: learning control unit
130B: learning control unit
140: projection unit
150: resolution conversion unit
200: storage device
300: display device
400: operation unit
500: communication unit
600: CT image
600A: cross section
600C: cross section
600S: cross section
610: CT image
610A: cross section
610C: cross section
610S: cross section
700: decubitus actual CT image
700A: decubitus actual CT image
700B: decubitus pseudo CT image

701A: decubitus CT image domain
701B: standing CT image domain
702: decubitus CT label data
704: standing CT label data
710: standing pseudo CT image
710A: standing pseudo CT image
710B: standing actual CT image
720: standing actual CT image
730: standing pseudo X-ray image
740: standing actual X-ray image
750: X-ray fluoroscopic image
760: high-resolution decubitus actual CT image
770: low-resolution decubitus actual CT image
780: low-resolution standing pseudo CT image
790: low-resolution standing actual CT image
800: high-resolution standing pseudo CT image
900: medical use image
900A: lung
900B: heart

What is claimed is:

1. A medical use image processing method executed by a medical use image processing device including a processor, the medical use image processing method comprising:
   causing the processor to execute
   a reception step of receiving input of a first medical use image actually captured in a first posture, and
   an image generation step of generating a second medical use image, in which the same portion as the first medical use image is imaged in a second posture different from the first posture, from the first medical use image in a pseudo manner, in which the second medical use image is generated by using a deformation vector field that converts the first medical use image into the second medical use image, wherein, in the image generation step, the processor generates the deformation vector field by using a generator that outputs the deformation vector field in a case in which the first medical use image is input and that has been trained through machine learning.

2. The medical use image processing method according to claim 1,
   wherein, in the image generation step, the processor generates the second medical use image by applying the deformation vector field to the first medical use image.

3. The medical use image processing method according to claim 1,
   wherein, in the image generation step, the processor converts a resolution of the first medical use image into a low resolution lower than a resolution before conversion,
   generates the deformation vector field from the first medical use image converted into the low resolution,
   converts a resolution of the generated deformation vector field into a high resolution higher than a resolution before conversion, and
   generates the second medical use image having a high resolution by applying the deformation vector field converted into the high resolution to the first medical use image.

4. The medical use image processing method according to claim 1,
   wherein the processor
   receives a CT image in which a decubitus posture is the first posture as the first medical use image in the reception step, and generates a CT image in which a standing posture is the second posture as the second medical use image in the image generation step.

5. The medical use image processing method according to claim 1,
wherein the processor further executes a modality conversion step of converting the second medical use image generated in a pseudo manner into a third medical use image having a modality different from the second medical use image in a pseudo manner.

6. The medical use image processing method according to claim 5,
wherein, in the modality conversion step, the processor generates an X-ray fluoroscopic image in the second posture as the third medical use image.

7. The medical use image processing method according to claim 1,
wherein, in the image generation step, the processor converts first label data corresponding to the first medical use image into second label data corresponding to the second medical use image by using the deformation vector field.

8. The medical use image processing method according to claim 1,
wherein the processor
receives a T1 enhancement MR image and a T2 enhancement MR image in which at least one of a standing posture or a decubitus posture is the first posture as the first medical use image in the reception step, and
generates a T1 enhancement MR image and a T2 enhancement MR image in which the other of the standing posture or the decubitus posture is the second posture in a pseudo manner in the image generation step.

9. The medical use image processing method according to claim 1,
wherein the processor
receives a chest CT image in which at least one of an expiratory posture or an inspiratory posture is the first posture as the first medical use image in the reception step, and
generates a chest CT image in which the other of the expiratory posture or the inspiratory posture is the second posture in a pseudo manner in the image generation step.

10. A non-transitory, computer-readable tangible recording medium which records thereon a program for causing, when read by a computer, the computer to execute the medical use image processing method according to claim 1.

11. A medical use image processing device comprising:
a processor,
wherein the processor executes reception processing of receiving input of a first medical use image actually captured in a first posture, and
image generation processing of generating a second medical use image, in which the same portion as the first medical use image is imaged in a second posture different from the first posture, from the first medical use image in a pseudo manner, in which the second medical use image is generated by using a deformation vector field that converts the first medical use image into the second medical use image, wherein, in the image generation processing of generating the second medical use image, the processor is configured to generate the deformation vector field by using a generator that outputs the deformation vector field in a case in which the first medical use image is input and that has been trained through machine learning.

12. A learning method of a medical use image processing device which includes a processor, the method including
receiving, by the processor, an input of a first medical use image actually captured in a first posture, and that generates a second medical use image, in which the same portion as the first medical use image is imaged in a second posture different from the first posture, from the first medical use image in a pseudo manner, the processor generating the second medical use image by using a deformation vector field that converts the first medical use image into the second medical use image;
receiving, by the processor, an input of the second medical use image and a fourth medical use image in which the same portion as the first medical use image is actually imaged in the second posture, and the processor identifies whether an input medical use image is the second medical use image or the fourth medical use image;
a generation unit learning step of updating, by the processor, a generation parameter used by the processor to generate the deformation vector field such that an identification error calculated by the processor is maximized while maintaining a parameter without updating; and
an identification unit learning step of updating, by the processor, the parameter such that the identification error is minimized while maintaining the generation parameter without updating.

13. The learning method according to claim 12,
wherein a step of smoothing the generated deformation vector field by inputting the first medical use image to the processor and adding a constraint to the generation parameter is provided in the generation unit learning step.

14. The learning method according to claim 12,
wherein the generation unit learning step and the identification unit learning step are performed by inputting the first medical use image and the fourth medical use image to the processor.

15. The learning method according to claim 14,
wherein the first medical use image and the fourth medical use image are medical use images for the same portion of different subjects.

16. The learning method according to claim 12,
wherein at least some steps of claim 13 are executed by using a neural network.

\* \* \* \* \*